United States Patent
Gjessing et al.

(10) Patent No.: US 10,677,653 B2
(45) Date of Patent: Jun. 9, 2020

(54) INFRARED RADIATION SOURCE

(71) Applicant: SINTEF TTO AS, Trondheim (NO)

(72) Inventors: Jo Gjessing, Oslo (NO); Jon Olav Grepstad, Oslo (NO); Hallvard Angelskår, Oslo (NO); Aasmund Sudbø, Oslo (NO); Thor Bakke, Lysaker (NO); Zeljko Skokic, Oslo (NO)

(73) Assignee: SINTEF TTO AS, Trondheim (NO)

( * ) Notice: Subject to any disclaimer, the term of this patent is extended or adjusted under 35 U.S.C. 154(b) by 0 days.

(21) Appl. No.: 15/757,858

(22) PCT Filed: Oct. 5, 2016

(86) PCT No.: PCT/EP2016/073724
§ 371 (c)(1),
(2) Date: Mar. 6, 2018

(87) PCT Pub. No.: WO2017/060264
PCT Pub. Date: Apr. 13, 2017

(65) Prior Publication Data
US 2018/0335345 A1 Nov. 22, 2018

(30) Foreign Application Priority Data
Oct. 5, 2015 (NO) .................................. 20151312

(51) Int. Cl.
*G01J 3/10* (2006.01)
*B82Y 20/00* (2011.01)

(52) U.S. Cl.
CPC .............. *G01J 3/108* (2013.01); *B82Y 20/00* (2013.01); *G01J 2003/102* (2013.01)

(58) Field of Classification Search
CPC ...................................................... G01J 3/108
USPC ................................ 250/493.1, 495.1, 504 R
See application file for complete search history.

(56) References Cited

U.S. PATENT DOCUMENTS

2004/0111132 A1* 6/2004 Shenderova ......... A61N 5/0616
607/88
2005/0200964 A1* 9/2005 Kopp ................. G01N 21/3151
359/634
(Continued)

FOREIGN PATENT DOCUMENTS

WO WO-2006010133 A2 1/2006
WO WO-2006031125 A1 3/2006
(Continued)

OTHER PUBLICATIONS

Homola, Jiri, et al., "Surface Plasmon Resonance Sensors: Review," Sensors and Actuators B: Chemical, vol. 54, Issues 1-2, Jan. 1999, pp. 3-15.
(Continued)

*Primary Examiner* — Jason L McCormack
(74) *Attorney, Agent, or Firm* — Winstead PC

(57) ABSTRACT

This invention relates to a source for emitting radiation in the infrared range comprising a thin membrane including a radiation element made from a semi-conductive material having a chosen dopant, the radiation element being connected to a frame, the frame comprising connector means for connecting to a power source for conducting an electrical current through the substrate, the radiation element being provided with a periodic modulation of the refractive index constituting a photonic crystal having a chosen period, thus defining an optical resonator at one or more chosen wavelengths, and wherein the membrane is mounted to the substrate through a number of conductor beams distributed along the membrane circumference so as to provide an even current distribution and thus even heating over the membrane.

13 Claims, 5 Drawing Sheets

(56) References Cited

U.S. PATENT DOCUMENTS

| | | | |
|---|---|---|---|
| 2007/0171120 A1 | 7/2007 | Puscasu et al. | |
| 2009/0101804 A1* | 4/2009 | Phan Le | G01P 15/093 |
| | | | 250/221 |
| 2009/0236614 A1* | 9/2009 | Puscasu | G01J 5/20 |
| | | | 257/84 |
| 2012/0170109 A1 | 7/2012 | Letartre et al. | |
| 2012/0235067 A1 | 9/2012 | Araci et al. | |
| 2013/0193308 A1* | 8/2013 | Cellek | H01L 31/1013 |
| | | | 250/208.1 |
| 2015/0179861 A1* | 6/2015 | Maes | G01J 5/02 |
| | | | 257/467 |

FOREIGN PATENT DOCUMENTS

| | | |
|---|---|---|
| WO | WO-2008086448 A2 | 7/2008 |
| WO | WO-2011033028 A1 | 3/2011 |

OTHER PUBLICATIONS

Besser, Veronika, "International Search Report," prepared for PCT/EP2016/073724, dated May 4, 2017, seven pages.

Grepstad, Jon Olav, et al., "Finite-Size Limitations on Quality Factor of Guided Resonance Modes in 2D Photonic Crystals," Optics Express, vol. 21, No. 20, Oct. 7, 2013, pp. 23640-23654.

Puscasu, Irina, et al., "Photonic Crystals Enable Infrared Gas Sensors," Proceedings of SPIE, vol. 5515, Jan. 1, 2004, pp. 58-66.

O'Regan, Bryan J., et al., "Silicon Photonic Crystal Thermal Emitter At Near-Infrared Wavelengths," Scientific Reports, vol. 5, Aug. 21, 2015, pp. 1-8.

Hartzell, A.L., et al., "MEMS Reliability," Chapter 2, Springer 2011, pp. 9-42.

Ghebrebrhan, M., et al., "Tailoring Thermal Emission Via Q Matching of Photonic Crystal Resonances," Physical Review A, vol. 83, Mar. 9, 2011 pp. 1-6.

El-Kady, I., et al., "Photonic Crystal High-Efficiency Multispectral Thermal Emitters," Applied Physics Letters 93, (2008), pp. 153501-1-153501-3.

Inoue, Takuya, et al., "Realization of Narrowband Thermal Emission With Optical Nanostructures," Optical Society of America, Optica, vol. 2, No. 1, Jan. 14, 2015, pp. 27-35.

Cleary, J.W., et al.; "IR permittivities for silicides and doped silicon"; J. Opt. Soc. Am. B/vol. 27, No. 4; Mar. 23, 2010; pp. 730-734.

Zhong, Yujun, et al.; "Review of mid-infrared plasmonic materials"; Journal of Nanophotonics, vol. 9; Feb. 3, 2015; 22 pages.

\* cited by examiner

INFRARED RADIATION SOURCE

This invention relates to an efficient infrared radiation (IR) source composed of a thin membrane structure, being heated by an applied electrical field, forcing a current through the structure.

IR sources are widely used within many spectroscopic applications. Infrared spectroscopy is being used in automated systems in the food industry to probe the condition of the food, as well as in the recycling industry to differentiate between different materials. Air pollution in big cities has harmful effects on human health and environment and therefore monitoring of gas emissions from traffic and industry is of high importance. New building standards are introducing better insulation and less natural ventilation in order to reduce energy consumption, thus increasing the demand for gas monitoring in order to regulate indoor climate. Another main class of spectroscopic applications is gas detection. Gas monitoring systems are required on all oil installations at sea for detecting poisonous or explosive gases and triggering alarms if a gas leak is detected. Apart from expensive laboratory equipment, gas is presently detected with three different sensor types: electrical, electrochemical and optical sensors. In applications requiring fast response, longevity and high sensitivity, optical sensors are the preferred choice.

Optical gas sensors are mainly based on IR absorption spectroscopy. In general terms, this is done by sending a spectrum of wavelengths through a gas volume representing the room or area that is to be controlled, while monitoring the absorbed wavelengths. Gas selectivity can be achieved since many gases have a unique spectral signature in the IR range, and the concentration can be found since the amount of gas is proportional to the absorption. This can be done by combining a tunable laser (narrow band source) with a detector or combining a thermal emitter (broadband IR source), a filter and a detector. Systems comprised of a tunable laser and detector are ideal with regards to speed and specificity, and highly suited for monitoring the gas concentrations in large open rooms (e.g. factories). The laser can be mounted in one end of the room and the detector on the other. However, they do usually need wiring due to high power consumption and are relatively expensive. Systems using a thermal emitter, an optical filter and a detector are on the other hand not as fast and they monitor the gas concentration in close vicinity to the sensor module. They are however significantly cheaper than a laser based system.

Present optical gas sensors are usually stationary and connected to a power source. Battery powered sensors would increase the flexibility and reduce the installation cost of such sensors and thereby opening many new markets. Most present sensors do, however, require too much power, and thus there is a need for more energy efficient sources.

MEMS fabrication techniques have proven to be a good tool for developing such energy efficient sources. They are typically made as membranes mounted in a protective housing, as discussed in the international patent application WO 2006/031125. In WO 2006/031125 several methods are discussed for producing an IR source from a membrane or ribbon made of Silicon suspended over a cavity. The membrane is resistively heated by applying a voltage that forces an electrical current through the membrane.

Intrinsic Silicon is transparent above its bandgap at 1.12 eV (at room temperature), which correspond to a wavelength of 1.1 µm, and, according to Kirchoff's law of thermal radiation, does not radiate above this wavelength. Doping of Silicon increases the number of free carriers and thereby the absorption and emissivity of the material. Doping is typically achieved by introducing donor atoms like Boron or Phosphorous into the Silicon material.

In order to increase the emitted power from the source, anti-reflective coatings have been applied to the membrane. This ensures that the light that is produced inside the source material can exit at the surface with very low reflectivity. Such coatings increase the optical output, but are also known to increase the stress in the membrane and thus reducing device life-time, as discussed in A. L. Hartzell, M. G. da Silva and H. Shea, "MEMS Reliability", Chapter 2, Springer (2011), ISBN 978-1-4419-6017-7.

A second inconvenience with AR-coatings is that they generally produce a broad emitted spectrum. By limiting the emitted spectrum to what is actually required one can in theory reduce the energy consumption significantly. A number of approaches have been proposed. M. Ghebrebrhan et al. discusses the relation between the geometry of a two-dimensional metallic photonic crystal and the material absorptivity in "Tailoring thermal emission via Q matching of photonic crystal resonances"; Physical Review A 83, 033810 (2011). Maximum absorption (and thereby emission) is achieved when the loss rate (or Q factor) of the optical modes and the loss rate caused by material absorption is equal in magnitude. I. El-Kady et al. shows through simulations in; "Photonic crystal high-efficiency multispectral thermal emitters"; Applied Physics Letters 93, 153501 (2008) that they are able to surpass the black body limit on emission within a narrow wavelength region by changing the photonic density of states using a 3D metallic photonic crystal. Takuya Inoue et al. discuss emission from metallic photonic crystals, metamaterials and all dielectric photonic crystals in their review article; "Realization of narrowband thermal emission with optical microstructures"; Optical Society of America, vol. 2, No. 1/January 2015/Optica. They use quantum wells made of GaAs and AlGaAs to control the absorptivity of the material by manipulating the number of electrons in the quantum wells and they are thereby able to tune the strength of the emission spectrum. The quantum wells are arranged in a photonic crystal structure. By matching the absorption spectrum of the quantum well and the mode of the photonic crystal they realize very narrow band emission.

Recently O'Regan et al. in "Silicon photonic crystal thermal emitter at near-infrared wavelengths", Sci Rep vol 5 p 13415 (2015), use a similar concept as the one presented here. They demonstrate a 220 nm thick Silicon photonic crystal membrane that is resistively heated by passing current through the photonic crystal element. They are able to produce an emission peak at 1.5 µm with a Q-factor of 18. However, the concept currently has large limitations in heat loss through supporting structure.

Another known radiation source is discussed in WO2006/010133 based on the use of surface plasmons, as also discussed in Jiří Homola et al: "Surface plasmon resonance sensors: review", Sensors and Actuators B: Chemical Volume 54, Issues 1-2, 25 Jan. 1999, Pages 3-15. The surface plasmons require the use of metallic or near metallic materials, and thus to the degree that WO2006/010133 disclose the use of silicon or similar materials they have to be heavily doped to obtain almost metallic properties. The solution would not work with semi-conductive materials.

The present invention is aimed at providing a low power IR source with long lifetime, which emits light as a result of heating, where the emission spectra can be designed to emit at fixed wavelength (narrow-band radiation) or set of wavelengths (broad-band radiation), and which may be produced in semi-conductive materials. We also present a solution for making a tunable IR source where both the strength and the position of the emission peaks can be tuned. This is achieved as described in the enclosed claims.

The design has two key elements. Firstly, the source is composed of a photonic crystal made in a semi-conducting material, which supports optical modes that control the emissivity of the material as a function of wavelength. Both high and low Q-factor modes are achievable, with center wavelengths and spectral extent depending on crystal design and material doping level (the doping level controls the carrier density and hence the absorption of the material). Secondly, the source is suspended in thin wires and is hermetically sealed in vacuum. This ensures that the applied power is used to heat a defined part of the source, and not its surroundings or package.

The present invention will be described below with reference to the accompanying figures, illustrating the invention by way of examples.

Figure 1:
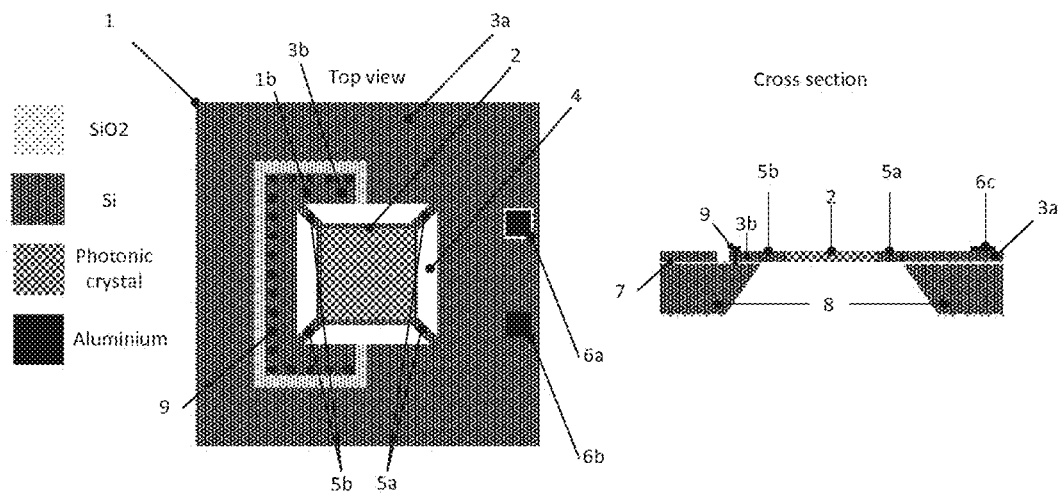
FIG. 1 illustrates a possible embodiment of the present invention.

FIG. 1 illustrates how a thermal design and a photonic crystal structure is combined according to the preferred embodiment of the invention, illustrated as seen from above and in cross section. The drawing shows a device, 1, fabricated on a Silicon on insulator wafer (SOI-wafer). It is composed of a radiation element, 2, with a frame, 8. Openings, 4, separate the frame, 8, physically and thermally from the element, 2, along a part of the circumference of the element. In the illustrated example, this provides four bridges, 5a and 5b, between the frame, 8, and the radiation element, 2. Electrical connection points, 6, are provided on the frame on two sides of the element, the electrical current thus being lead through the bridges and the element, thus heating the element.

As is seen in the cross section of the device, the heating of radiation element 2 is achieved as follows: A voltage is applied to electrode 6b and the bulk, 8, is grounded via electrode 6a. This allows for a current to flow through the device layer, 3a, through the two brides on the left side, 5a, through the element, 2, through the bridges on the right side, 5b, through the isolated part of the device layer, 3b, through the plug 9, and out to electrode 6a via the bulk, 8. Other solutions and connection point positioned may be contemplated, depending on the use and external requirements.

As illustrated, the photonic crystal, 2, the device layer and the bulk in the preferred embodiment is made from Silicon, while $SiO_2$ is used for insulation, 7. Aluminum is used for bonding pads and vias, 6a and 6b.

As discussed above, the present invention provides a more efficient source with increased control over the emitted wavelengths as all emitted energy is confined to a predetermined spectral region (or spectral regions), thus rendering the radiated power outside the predetermined spectral region very low. Moreover, the thermal design, e.g. based on openings between the emitting element and the frame and a hermetically sealed vacuum housing, will reduce the power lost through conduction and convection, respectively. In addition, the life span of the element is increased as anti-reflecting coatings are omitted, leaving the structure with little strain.

Figure 2:
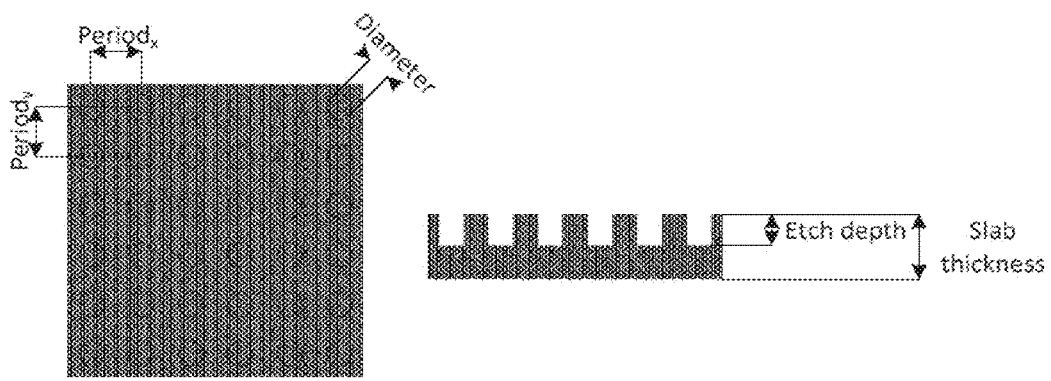
FIG. 2 illustrates some of the parameters to be chosen in a photonic crystal.

FIG. 2 illustrates the photonic crystal, constituting the radiating element, 1, in FIG. 1, where the period in the x and z direction, diameter and depths of the openings, as well as the thickness, may be chosen according to the required emission wavelengths. By tuning the geometry of the photonic crystal, the center wavelength and spectral width of the absorption peaks, corresponding to the emission peaks, may be controlled. Typical dimensions are in the micron and sub-microns regime.

Figure 3:
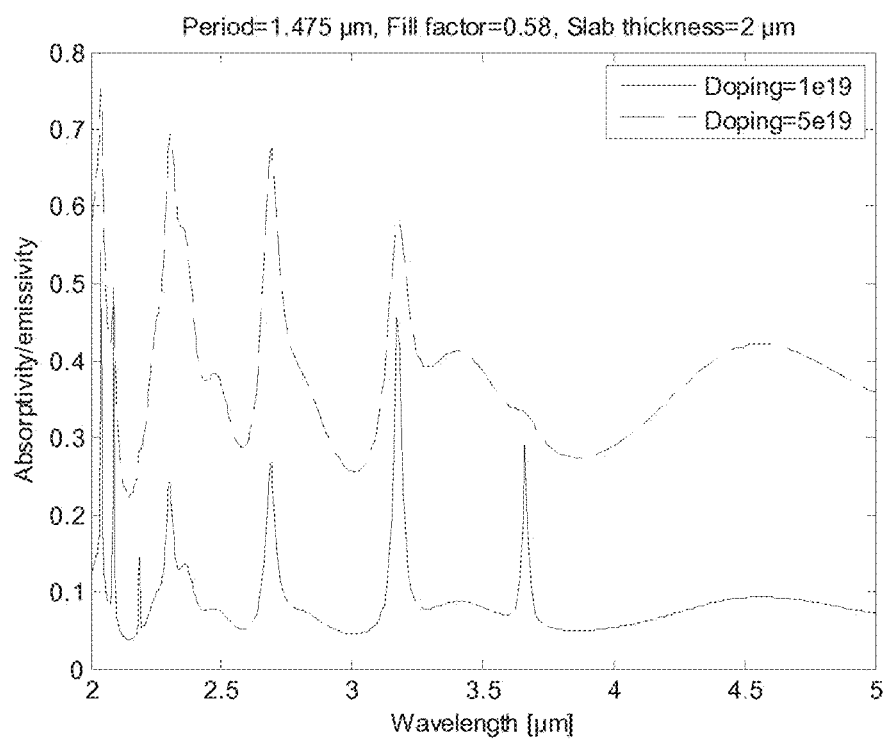
FIG. 3 illustrates the absorption spectra with two different doping levels

In FIG. 3, the simulated absorption response of the element 2, and thus its resulting emission, is illustrated for two different doping levels, constituted by a photonic crystal with openings extending through the element. As may be seen, it is possible to provide several emission peaks between 2 and 5 µm. The number of peaks can be reduced by using a thinner Silicon slab, reducing the period of the photonic crystal or by increasing the diameter of the holes.

Figure 4:
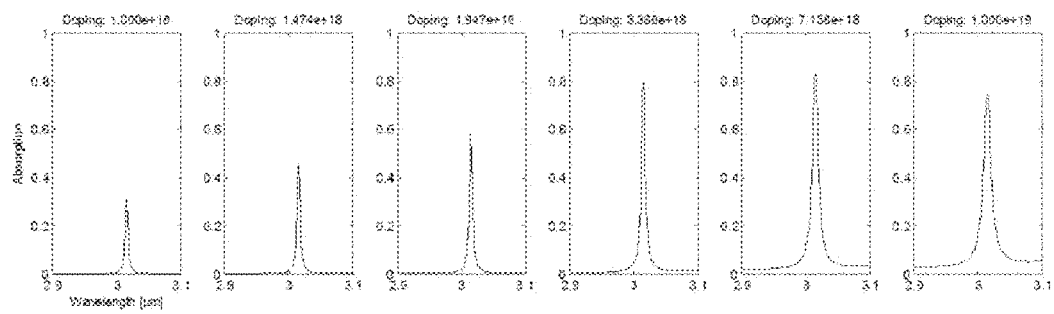
FIG. 4 illustrates the strength of the absorption peak with different doping levels.

In the spectra illustrated in FIG. 4 the period, fill factor (area of holes divided by unit cell area), and thickness is the same as in FIG. 3: 1.475 µm, 0.58 and 2 µm respectively. We observe the strength of one emission peak as we vary the phosphor doping from $1\times10^{18}$ cm$^{-3}$ to $1\times10^{19}$ cm$^{-3}$. The position of the absorption peak is not changed, but the strength of the peak varies with doping. For this particular configuration the emissivity reaches a maximum for a doping below $1\times10^{19}$ cm$^{-3}$. Thus the emissivity of the IR source may be optimized by a combination of photonic crystal dimensions, adjusting the position of the peaks, and doping, adjusting the strength of absorption. Maximum absorption is achieved when the optical and absorption Q-factor is matched. While the doping in the examples is considered to be fairly uniform over the radiation element, 2, it is also possible to adjust the doping distribution so as to control the emission profile over the element.

Figure 5:
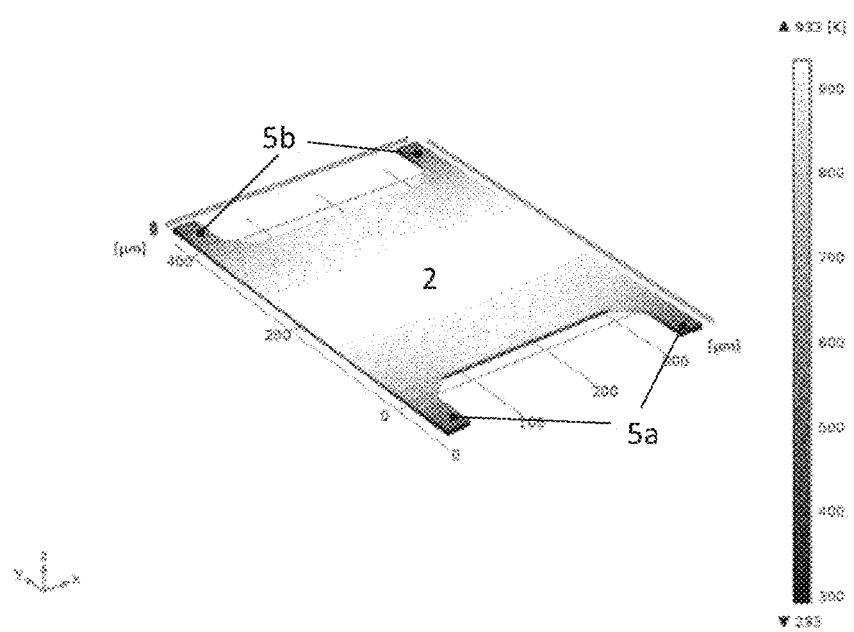
FIG. 5 illustrates a thermal simulation of the IR source.

The IR source according to the invention is based on a thin, membrane like element having a distributed emission over the membrane including the photonic crystal. Preferably, the IR source, according to the invention, should distribute the heat in such a way as to achieve a homogenous temperature over the surface of the membrane. This will provide a homogeneous emissivity over the whole element. The preferred structure is illustrated in FIG. 5, where the membrane radiation element, 2, is provided with four beams, 5a and 5b, connecting the membrane to the frame. The heating of the element is obtained by applying a voltage forcing an electrical current between two pairs of beams, 5a and 5b, through the membrane radiation element, 2. This has been shown in simulations to provide an even temperature distribution over the membrane.

Figure 6:
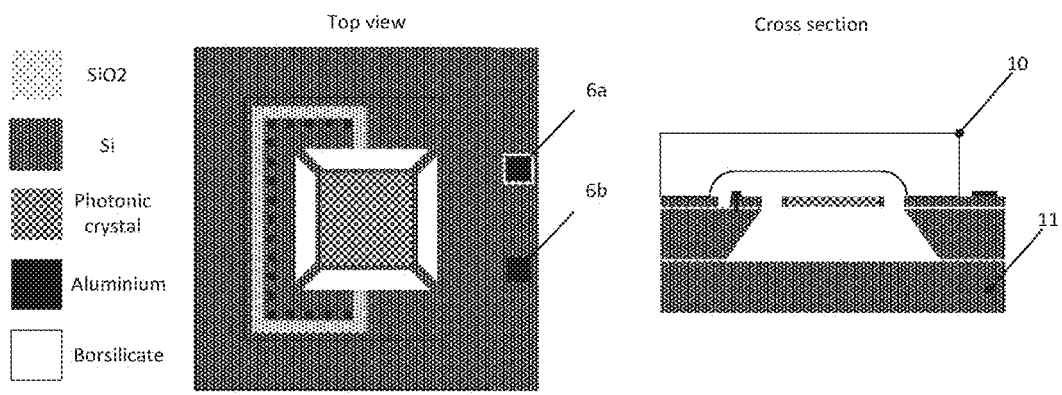
FIG. 6 illustrates a possible embodiment of the invention.

In FIG. 6, an entire source according to a preferred embodiment of the invention is illustrated as seen from above (Top view) and in cross section (Cross section). The cross section illustration shows how the heater element is mounted in a housing, here composed of an etched Borosilicate glass cap, 10, and a flat piece of a Silicon wafer, 11.

When electrode 6a and 6b, are connected to a power supply, current flows (e.g. from 6a, but this depends on voltage polarity) through the first pair of beams in the device layer, through the heater/radiation element, 2, and out through the second pair of beams to ground (e.g. 6b, but this depends on voltage polarity). Since the beams holding the heater element are thin, they isolate the heater element and ensure minimal heat loss through the beams. The photonic crystal membrane is preferably also in a hermetically sealed housing, providing a vacuum, e.g. as discussed WO2006/031125. One side of the housing is typically transparent, in this case Silicon, 11, allowing infrared light to exit.

Figure 7:
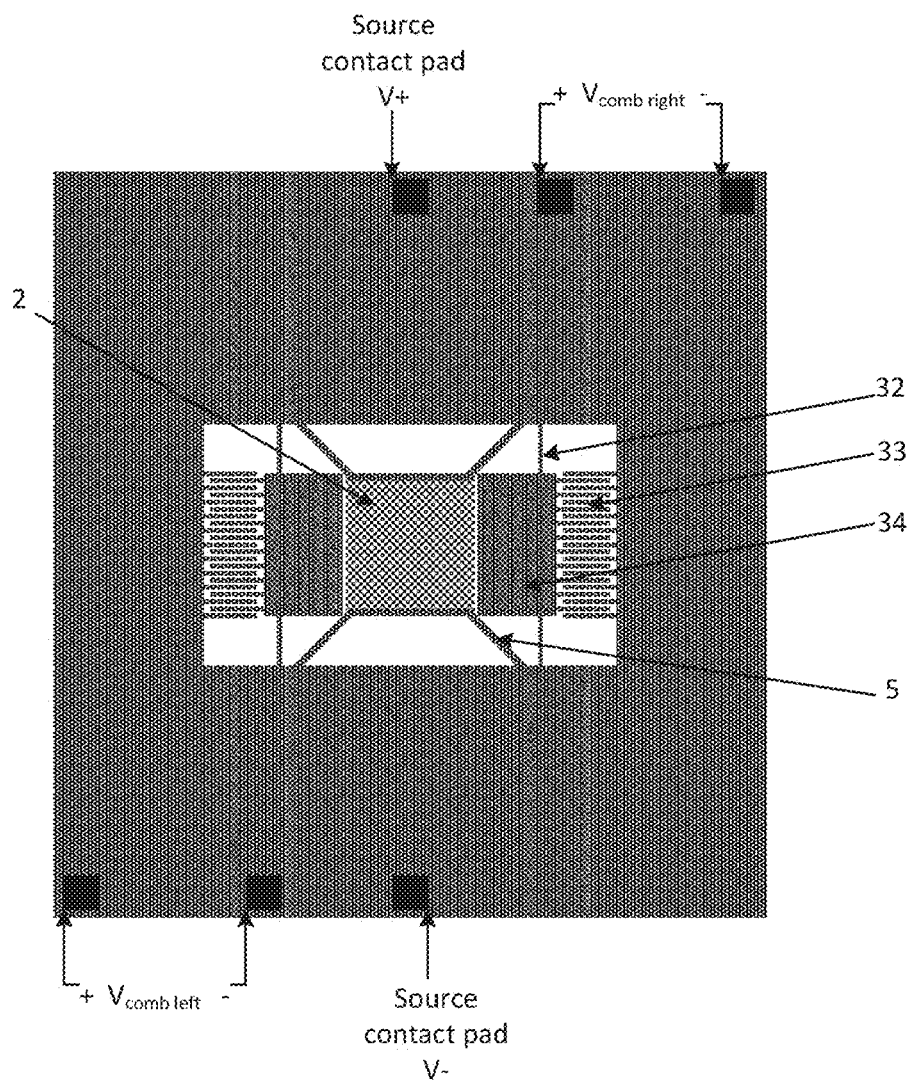
FIG. 7 illustrates an alternative embodiment of the invention.

FIG. 7 illustrates an embodiment providing a tunable IR-source, also fabricated in an SOI-wafer. The heated element, 2, with the doped semiconducting photonic crystal, is the same as in FIGS. 1, 2, 5 and 6, and may be isolated in a sealed vacuum housing. However, in the embodiment in FIG. 7, two Bragg mirrors, 34, are positioned on the sides of the element, 2. These Bragg mirrors, 34, are supported by springs, 32, and may be shifted sideways using two comb drives, 33, connected to a power source through associated electrodes, $V_{comb\ right}$ and $V_{comb\ left}$. In FIG. 7, the electrodes, V+ and V−, are positioned on opposite sides of the radiation element 2 and the sides are insulated from each other in the plane so that the supporting structure (8 in FIG. 1) is not used for conduction purposes.

The position of the Bragg mirrors, 34, controls the length of an optical resonator between the Bragg mirrors. The effect of adjusting the position is that the emissivity of the photonic crystal, 2, is changed as the resonances of the Bragg mirrors, 34, will interact with the resonances of the photonic crystal. The combination may thus be designed to emit at a tunable limited optical bandwidth. This is discussed in detail in the article by Grepstad et al. "Finite-size limitations on Quality Factor of guided resonance modes in 2D Photonic Crystals", 7 Oct. 2013 |Vol. 21, No. 20 |DOI:10.1364/OE.21.023640 |OPTICS EXPRESS.

Figure 8:
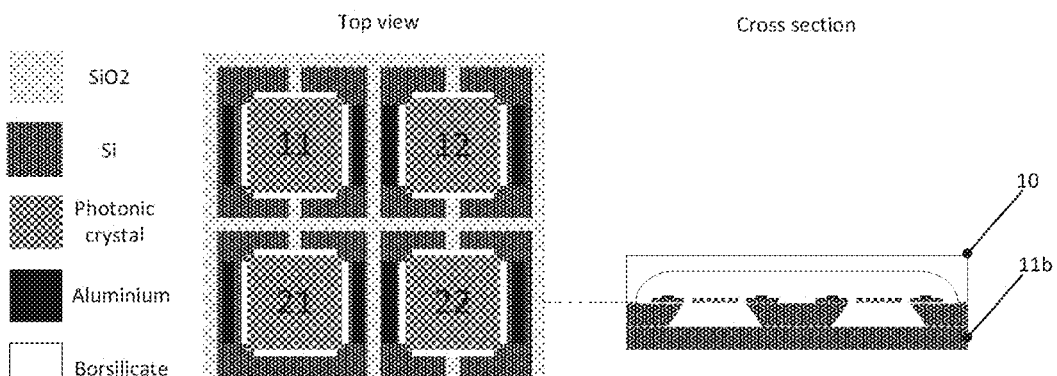
FIG. 8 illustrates an alternative embodiment of the invention.

FIG. 8 illustrates an IR source composed of four (may in principle be many more) independent photonic crystal membranes with different dimensions 11,12,21,22 that can be switched on and off independently. Each crystal emits a specific spectrum. In this way, the emitted spectrum can be chosen by heating the different crystals, or one can create a combination of spectrums by heating a set of crystals. The crystals are placed close to each other, within a sealed cavity, as discussed in relation to FIG. 6, results in a distant observer perceiving the cluster of sources as a point source. In this way a variety of different wavelengths may be provided by combining the several different sources.

Figure 9:
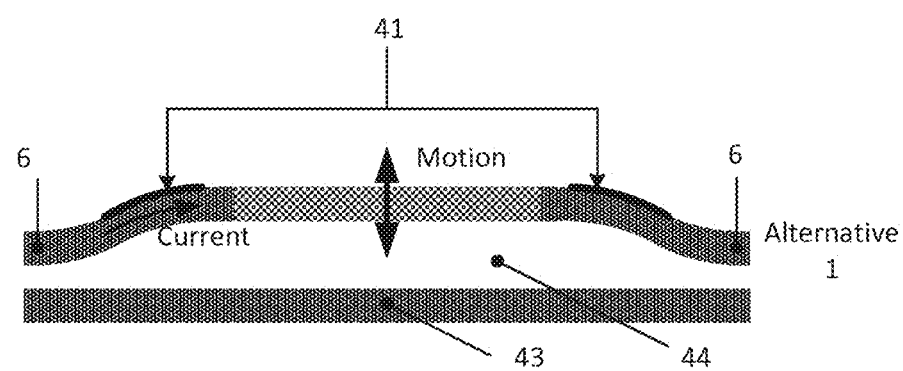
FIG. 9 illustrates an alternative embodiment of the invention.
Figure 9:
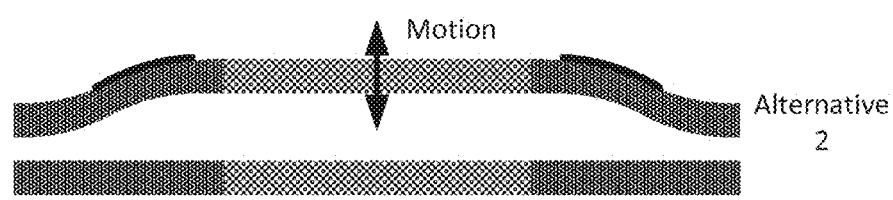

FIG. 9 (the last figure) illustrates an IR source where the gap, 44, between the suspended photonic crystal membrane, 2, and the rear surface, 43, can be adjusted (e.g. by using piezo electric actuators, 41, as explained in WO2011/033028 using a controller). Adjusting this gap, 44, will alter the modes of the photonic crystal and this will allow for spectral tuning of the absorption peaks. The rear surface may be coated with optical coatings or it may be uncoated to allow for various degrees of interaction with the photonic crystal. The gap size will be in the same order of magnitude as the thickness of the membrane, i.e. from below one micron to a few micrometer of air/vacuum. This solution may also be combined with other sources as in FIG. 8, e.g. in the same housing.

To summarize, the present invention relates to a source for emitting radiation in the infrared range comprising a thin membrane including a radiation element made from a semiconductive material, such as silicon, having a chosen dopant. The radiation element being connected to a frame, the frame comprising connector means for connecting to a power source for conducting an electrical current through the radiation element. The radiation element is provided with a periodic modulation of refractive index, for example a pattern of recesses or openings as illustrated in FIG. 2, i.e. a photonic crystal having a chosen period, thus defining a resonator with optical modes at one or more chosen wavelengths.

The membrane is mounted to the substrate through a number of thin conductor beams distributed along the membrane circumference so as to provide an even current distribution and thus even heating over the membrane. Preferably the number of conductor beams is constituted by four conductor beams being evenly distributed around the radiation element circumference, two of which being positioned on one side of said radiation element and connected to a first connector means and the others being connected to a second connector means thus leading said current through said radiation element. The conductor beams are preferably made from the same semi conductive membrane material as the radiation element and the upper part of the frame, 1a.

The radiation element is preferably positioned in a hermetically sealed vacuum housing, in order to thermally isolate the membrane from the structure in which it is suspended and from its surroundings, respectively.

The type of dopant and said doping level is chosen so as to provide the radiation element material with predetermined properties such as optical absorption, and resistivity. The doping level may be evenly distributed over said radiation element, or the doping level may vary over the element in order to provide a chosen profile, or for compensating for uneven heating distribution by enabling a non-uniform resistivity across the membrane.

The recesses in said radiation element providing said photonic crystal may be openings running through or partly through the membrane, and are arranged with a preferred membrane thickness, period and fill factor which are chosen depending on the required emission characteristics. Thus the membrane thickness, hole depth, period, fill factor and doping level in said photonic crystal is tuned to produce a preferred emissivity as a function of wavelength, enabling both broad- and narrow-band optical emittance when the membrane is heated.

As illustrated in FIG. 7 at least one movable Bragg mirror is provided at the circumference of the membrane part to tune the optical emittance when shifted in the plane as the resonances in the photonic crystal are coupled with the resonances of the Bragg grating. In a similar way the radiation element including the photonic crystal may be positioned in close proximity to a parallel slab or second photonic crystal with a gap between them, said gap being tunable thus enabling the optical emittance to be tuned when the gap is tuned. As illustrated in FIG. 9, another alternative is to provide a reflector on one side of said radiation element. The optical modes defining the spectral output of the element are sensitive to any change in refractive index close to the membrane (close being 1-2 wavelengths above or below the element surface). Adapting a bending actuator to tune the distance of a second slab from said radiation, hence enables tuning of the optical properties of the radiation element, and thus also the characteristics and spectrum of the emitted light.

In addition, several sources may be combined, preferably close together and made from the membrane and in the same housing or thermally isolated in separate housings to allow heating and cooling more independently, as shown in FIG. 8.

The invention claimed is:

1. A source for emitting radiation in the infrared range, the source comprising:

a membrane radiation element with a thickness in the range from below one to a few micrometers, the membrane radiation element consisting of a semiconductive material having a chosen dopant, the membrane radiation element being connected to a frame, the frame being connectable to a power source for conducting an electrical current through the frame;

wherein the membrane radiation element is provided with a periodic modulation of the refractive index constituting a photonic crystal having a chosen period, thus defining an optical resonator at at least one chosen wavelengths and a doping type and a doping level are chosen so as to provide absorption and thus emissivity in the infrared range;

wherein the doping level is less than $1\times10^{19}$ cm$^{-1}$; and wherein the membrane radiation element is mounted to the frame through a plurality of conductor beams distributed along the membrane circumference so as to provide an even current distribution and thus even heating over the membrane.

2. The source according to claim 1, wherein the membrane radiation element is hermetically encapsulated in order to thermally isolate the membrane radiation element from the structure in which it is suspended and from its surroundings, respectively.

3. The source according to claim 1, wherein the plurality of conductor beams consists of four conductor beams evenly distributed around the membrane radiation element circumference, two of which being positioned on one side of the membrane radiation element and connected to a first connector and the others being connected to a second connector thus leading the current through the membrane radiation element.

4. The source according to claim 1, wherein the dopant is at least one of phosphor doping and boron doping.

5. The source according to claim 1, wherein the doping is evenly distributed over the membrane radiation element.

6. The source according to claim 1, wherein the membrane radiation element material is doped non-uniformly across the membrane radiation element, enabling a non-uniform resistivity across the membrane radiation element.

7. The source according to claim 1, wherein the modulation in the refractive index constituting the photonic crystal are defined by recesses in the membrane radiation element providing the photonic crystal and are arranged with a preferred period and fill factor.

8. The source according to claim 7, wherein the recesses are openings running through or partly through the membrane radiation element.

9. The source according to claim 1, wherein the membrane radiation element thickness, hole depth, period, fill factor and doping level in the photonic crystal are chosen to produce a preferred emissivity in at least one selected wavelength.

10. The source according to claim 1, comprising at least one movable Bragg mirror provided at the circumference of the membrane radiation element and in the membrane radiation element plane, the Bragg mirror being adapted to be shifted sideways in the membrane radiation element plane so as to tune the emissivity by controlling the length of the optical resonator with respect to the emissivity of the photonic crystal.

11. The source according to claim 1, where the membrane radiation element including the photonic crystal is positioned in proximity to a parallel slab or second photonic crystal with the gap between them, the gap being tunable in a range of 1-2 wavelengths of the radiation, thus enabling the emissivity and optical emittance to be tuned when the gap is tuned.

12. The source according to claim 1, including a slab on one side of the membrane radiation element enabling tuning of the refractive index in a distance within 1-2 wavelengths above or below the membrane radiation element, and a bending actuator being adapted to provide a movement between the membrane radiation element and the slab.

13. A source assembly including at least two sources according to claim 1, the sources being thermally isolated, situated side by side, thus being heated and cooled independently, enabling tunable broad-band and narrow-band optical emittance by heating one crystal at a time or combining the radiation from many sources simultaneously.

* * * * *